United States Patent
Pham et al.

[11] Patent Number: 6,025,420
[45] Date of Patent: Feb. 15, 2000

[54] COMPOSITIONS FOR TOUGH AND EASY MELT PROCESSIBLE POLYCARBONATE/POLYOLEFIN BLEND RESIN

[75] Inventors: Hoang T. Pham, Lake Jackson, Tex.; Sarada P. Namhata, Terneuzen, Netherlands; Clive P. Bosnyak, Midland, Mich.

[73] Assignee: The Dow Chemical Company, Midland, Mich.

[21] Appl. No.: 08/899,533

[22] Filed: Jul. 24, 1997

[51] Int. Cl.[7] ...................................................... C08L 69/00
[52] U.S. Cl. ........................... 524/115; 524/155; 524/409; 524/445; 524/456; 524/449; 524/451; 524/504; 525/65; 525/67
[58] Field of Search ........................ 525/67, 65; 524/115, 524/155, 409, 445, 449, 451, 456, 504

[56] References Cited

U.S. PATENT DOCUMENTS

| | | |
|---|---|---|
| 3,489,821 | 1/1970 | Witt et al. . |
| 3,489,822 | 1/1970 | Witt et al. . |
| 3,642,950 | 2/1972 | O'Shea . |
| 3,645,992 | 2/1972 | Elston . |
| 4,550,138 | 10/1985 | Paddock et al. . |
| 4,638,033 | 1/1987 | Boutni et al. . |
| 4,701,432 | 10/1987 | Welborn, Jr. . |
| 4,798,081 | 1/1989 | Hazlitt et al. . |
| 4,935,397 | 6/1990 | Chang . |
| 4,937,299 | 6/1990 | Ewen et al. . |
| 4,937,301 | 6/1990 | Chang . |
| 5,021,504 | 6/1991 | Fujita ........................................ 525/67 |
| 5,055,438 | 10/1991 | Canich . |
| 5,272,236 | 12/1993 | Lai et al. . |
| 5,278,272 | 1/1994 | Lai et al. . |
| 5,416,148 | 5/1995 | Farah et al. . |
| 5,786,424 | 7/1998 | Hofmeister ............................... 525/67 |

FOREIGN PATENT DOCUMENTS

| | | |
|---|---|---|
| 129368 | 12/1984 | European Pat. Off. . |
| 260999 | 3/1988 | European Pat. Off. . |
| 0743343 | 11/1996 | European Pat. Off. . |
| 90/07526 | 7/1990 | WIPO . |
| 94/06859 | 3/1994 | WIPO . |

OTHER PUBLICATIONS

Wild, Journal of Polymer Science, Polymer Physics Edition, vol. 20, pp. 441 (1982).

*Primary Examiner*—David Buttner

[57] ABSTRACT

A polymer blend composition with a good balance of high impact resistance and moldablity with reduced tendencies of delamination in molded articles is prepared by admixing with polycarbonate a substantially linear ethylene polymer or linear ethylene polymer, and a compatibilizing graft copolymer of a styrene and acrylonitrile copolymer grafted to an ethylene, propylene, and optional diene copolymer.

20 Claims, No Drawings

COMPOSITIONS FOR TOUGH AND EASY MELT PROCESSIBLE POLYCARBONATE/POLYOLEFIN BLEND RESIN

FIELD OF THE INVENTION

This invention relates to polymer compositions containing a polycarbonate, a substantially linear ethylene polymer or a linear ethylene polymer, and a compatibilizing graft copolymer comprising a copolymer component grafted onto an olefinic polymer substrate component and methods of preparation of such compositions. This invention relates particularly to compatibilized polycarbonate and substantially linear ethylene polymer or linear ethylene polymer compositions which, when molded, display a desirably high level of impact resistance and melt processability.

BACKGROUND OF THE INVENTION

Polycarbonate has found many uses because, in general, articles molded from polycarbonate demonstrate a high level of heat resistance and dimensional stability with good insulating and non-corrosive properties. However, polycarbonate is difficult to mold and suffers from an inability to fill thinwall injection molded articles. This disadvantage has been somewhat relieved by decreasing the molecular weight of the polycarbonate to lower its viscosity. However, its ductility is often reduced as a result. This disadvantage has been alleviated to some extent by the practice of blending polycarbonate with emulsion or core-shell elastomers such as methacrylate, butadiene, and styrene copolymer or a butyl acrylate rubber. However, these core shell rubbers hinder processability of the blend by increasing viscosity.

Alternatively, polycarbonate can be blended with various olefin polymers to lower the viscosity of the blend. One of the resulting disadvantages with blending polycarbonate with an olefin polymer, is the tendency to delaminate which results in a reduction of impact resistance, toughness, and weldline strength of the blended polycarbonate. References are known which disclose compositions of a blend of a polycarbonate and a styrene and acrylonitrile copolymer grafted to an ethylene, propylene, and optional diene copolymer such as U.S. Pat. No. 4,550,138. Further, the practice of blending polycarbonate with a polyolefin produced by a conventional coordination catalyst, such as a "Ziegler" type, "Philips" type, or a "chromium" type, and an ethylene-propylene-diene terpolymer is discussed in U.S. Pat. No. 4,638,033 and EP 0 743 343 A2.

Other references disclose compositions of a polycarbonate and a substantially linear ethylene polymer or linear ethylene polymers among these are WO 94/06859 and U.S. Pat. No. 5,416,148. It would be desirable if modifiers blended with polycarbonate for the purpose of improving impact resistance would also lower the viscosity of the blend while not causing delamination or preferably improving resistance to delamination as evidenced by the degree of peeling or splintering in a molded article.

SUMMARY OF THE INVENTION

It has been found that articles molded from a polycarbonate blended with a substantially linear ethylene polymer or a linear ethylene polymer and a compatibilizing graft copolymer, comprising a copolymer component grafted onto an olefinic polymer substrate component, possess a good balance of processability, impact resistance, and weld line strength while showing a reduced tendency towards delamination.

In one aspect, this invention involves a polymer blend composition comprising, in admixture:
 (a) a polycarbonate in an amount from about 50 to about 98.99 parts by weight;
 (b) a substantially linear ethylene polymer or a linear ethylene polymer in an amount from about 1 to about 49.99 parts by weight, which has:
  (i) a density of less than about 0.93 g/cm$^3$,
  (ii) a molecular weight distribution, $M_w/M_n$, of less than about 3.0, and
  (iii) a Composition Distribution Branch Index of greater than about 50 percent; and
 (c) a compatibilizing graft copolymer comprising a copolymer component grafted onto an olefinic polymer substrate component, said compatibilizing graft copolymer in an amount from about 0.01 parts by weight to about 10 parts by weight; said weight parts being based on 100 weight parts components (a), (b) and (c).

This invention also involves a method of preparing a strengthened polycarbonate by blending it with at least a substantially linear ethylene polymer or a linear ethylene polymer and a compatibilizing graft copolymer comprising a copolymer component grafted onto an olefinic polymer substrate component. Further, this invention involves a method of molding polycarbonate whereby polycarbonate is admixed with a substantially linear ethylene polymer or linear ethylene polymer and a compatibilizing graft copolymer and is then molded.

The polymer compositions of this invention are useful, for example, in the production of films, fibers, extruded sheets, multi-layer laminates and molded or shaped articles of virtually all varieties, especially appliance and instrument housings, motor vehicle body panels and other parts and components for use in interior and exterior automotive applications, data storage apparatus, and electrical and electronics applications.

DETAILED DESCRIPTION OF THE INVENTION

Component (a) in the polycarbonate blend compositions of this invention is a thermoplastic polycarbonate ("PC") polymer. The polycarbonates suitable for use in this invention are well known in the literature and can be prepared by known techniques. In general, polycarbonate can be prepared from one or more multihydric compounds by reacting the multihydric compounds, preferably an aromatic dihydroxy compound such as a diphenol, with a carbonate precursor such as phosgene, a haloformate or a carbonate ester such as diphenyl or dimethyl carbonate. Preferred diphenols are 2,2-bis(4-hydroxyphenyl)-propane; 1,1-bis(4-hydroxyphenyl)-1-phenylethane; 3,3-bis(para-hydroxyphenyl)phthalide and bishydroxyphenylfluorene. The polycarbonates can be prepared from these raw materials by any of several known processes such as the known interfacial, solution or melt processes. As is well known, suitable chain terminators and/or branching agents can be employed to obtain the desired molecular weights and branching degrees.

It is understood, of course, that the polycarbonate may be derived from (1) two or more different dihydric phenols or (2) a dihydric phenol and a glycol or a hydroxy-or acid-terminated polyester or a dibasic acid in the event a carbonate copolymer or heteropolymer rather than a homopolymer is desired. Also suitable for the practice of this invention are blends of two or more of the above polycarbonates. Also included in the term polycarbonate are the poly(ester-carbonates).

The polycarbonate is employed in the polymer blend compositions of the present invention in amounts sufficient to provide the desired balance of physical properties and impact resistance. In general, the polycarbonate is employed in amounts of at least about 50 parts by weight, preferably at least about 65 parts by weight, more preferably at least about 80 parts by weight, and most preferably at least about 90 parts by weight based on 100 weight parts components (a), (b) and (c). In general, the polycarbonate is used in amounts less than or equal to about 99 parts by weight, preferably less than or equal to about 96 parts by weight, more preferably less than or equal to about 93 parts by weight, and most preferably less than or equal to about 90 parts by weight based on 100 weight parts components (a), (b) and (c).

Component (b) in the compositions of this invention is one or more substantially linear ethylene polymer or one or more linear ethylene polymer ("S/LEP"), or a mixture of one or more of each. Both substantially linear ethylene polymers and linear ethylene polymers are known. Substantially linear ethylene polymers and their method of preparation are fully described in U.S. Pat. Nos. 5,272,236 and U.S. Pat. No. 5,278,272. Linear ethylene polymers and their method of preparation are fully disclosed in U.S. Pat. Nos. 3,645,992; 4,937,299; 4,701,432; 4,937,301; 4,935,397; 5,055,438; EP 129,368; EP 260,999; and WO 90/07526.

As used here, "a linear ethylene polymer" means a homopolymer of ethylene or a copolymer of ethylene and one or more alpha-olefin comonomers having a linear backbone (i.e. no cross linking), no long-chain branching, a narrow molecular weight distribution and, for alpha-olefin copolymers, a narrow composition distribution. Further, as used here, "a substantially linear ethylene polymer" means a homopolymer of ethylene or a copolymer of ethylene and of one or more alpha-olefin comonomers having a linear backbone, a specific and limited amount of long-chain branching, a narrow molecular weight distribution and, for alpha-olefin copolymers, a narrow composition distribution.

Short-chain branches in a linear copolymer arise from the pendent alkyl group resulting upon polymerization of intentionally added $C_3$ to $C_{20}$ alpha-olefin comonomers. Narrow composition distribution is also sometimes referred to as homogeneous short-chain branching. Narrow composition distribution and homogeneous short-chain branching refer to the fact that the alpha-olefin comonomer is randomly distributed within a given copolymer of ethylene and an alpha-olefin comonomer and virtually all of the copolymer molecules have the same ethylene to comonomer ratio. The narrowness of the composition distribution is indicated by the value of the Composition Distribution Branch Index ("CDBI") or sometimes referred to as Short Chain Branch Distribution Index. CDBI is defined as the weight percent of the polymer molecules having a comonomer content within 50 percent of the median molar comonomer content. The CDBI is readily calculated, for example, by employing temperature rising elution fractionation, as described in Wild, Journal of Polymer Science, Polymer Physics Edition, Volume 20, page 441 (1982), or U.S. Pat. No. 4,798,081. The CDBI for the substantially linear ethylene copolymers and the linear ethylene copolymers in the present invention is greater than about 30 percent, preferably greater than about 50 percent, and more preferably greater than about 90 percent.

Long-chain branches in substantially linear ethylene polymers are polymer branches other than short chain branches. Typically, long chain branches are formed by insitu generation of an oligomeric alpha-olefin via beta-hydride elimination in a growing polymer chain. The resulting species is a relatively high molecular weight vinyl terminated hydrocarbon which upon polymerization yields a large pendent alkyl group. Long-chain branching may be further defined as hydrocarbon branches to a polymer backbone having a chain length greater than n minus 2 ("n-2") carbons, where n is the number of carbons of the largest alpha-olefin comonomer intentionally added to the reactor. Preferred long-chain branches in homopolymers of ethylene or copolymers of ethylene and one or more $C_3$ to $C_{20}$ alpha-olefin comonomers have at least from 20 carbons up to more preferably the number of carbons in the polymer backbone from which the branch is pendant. Long-chain branching may be distinguished using $^{13}C$ nuclear magnetic resonance spectroscopy alone, or with gel permeation chromatography-laser light scattering ("GPC-LALS") or a similar analytical technique. Substantially linear ethylene polymers contain at least 0.01 long-chain branches/1000 carbons and preferably 0.05 long-chain branches/1000 carbons. In general, substantially linear ethylene polymers contain less than or equal to 3 long-chain branches/1000 carbons and preferably less than or equal to 1 long-chain branch/1000 carbons.

Preferred substantially linear ethylene polymers are prepared by using metallocene based catalysts capable of readily polymerizing high molecular weight alpha-olefin copolymers under the process conditions. As used here, copolymer means a polymer of two or more intentionally added comonomers, for example, such as might be prepared by polymerizing ethylene with at least one other $C_3$ to $C_{20}$ comonomer. Preferred linear ethylene polymers may be prepared in a similar manner using, for instance, metallocene or vanadium based catalyst under conditions that do not permit polymerization of monomers other than those intentionally added to the reactor. Other basic characteristics of substantially linear ethylene polymers or linear ethylene polymers include a low residuals content (i.e. a low concentration therein of the catalyst used to prepare the polymer, unreacted comonomers and low molecular weight oligomers made during the course of the polymerization), and a controlled molecular architecture which provides good processability even though the molecular weight distribution is narrow relative to conventional olefin polymers.

While the substantially linear ethylene polymers or the linear ethylene polymers used in the practice of this invention include substantially linear ethylene homopolymers or linear ethylene homopolymers, preferably the substantially linear ethylene polymers or the linear ethylene polymers comprise between about 50 to about 95 weight percent ethylene and about 5 to about 50, and preferably about 10 to about 25 weight percent of at least one alpha-olefin comonomer. The comonomer content in the substantially linear ethylene polymers or the linear ethylene polymers is generally calculated based on the amount added to the reactor and as can be measured using infrared spectroscopy according to ASTM D-2238, Method B. Typically, the substantially linear ethylene polymers or the linear ethylene polymers are copolymers of ethylene and one or more $C_3$ to $C_{20}$ alpha-olefins, preferably copolymers of ethylene and one or more $C_3$ to $C_{10}$, alpha-olefin comonomers and more preferably copolymers of ethylene and one or more comonomers selected from the group consisting of propylene, 1-butene, 1-hexene, 4-methyl-1-pentane, and 1-octene. Most preferably the copolymers are ethylene and 1-octene copolymers.

The density of these substantially linear ethylene polymers or linear ethylene polymers is equal to or greater than 0.850 grams per cubic centimeter (g/cm$^3$) and preferably equal to or greater than 0.860 g/cm$^3$. Generally, the density of these substantially linear ethylene polymers or linear ethylene polymers is less than or equal to about 0.935 g/cm³ and preferably less than or equal to about 0.900 g/cm³. The melt flow ratio for substantially linear ethylene polymers, measured as $I_{10}/I_2$, is greater than or equal to about 5.63, is preferably from about 6.5 to about 15, and is more preferably from about 7 to about 10. $I_2$ is measured according to ASTM Designation D 1238 using conditions of 190° C. and 2.16 kilogram ("kg") mass. $I_{10}$ is measured according to ASTM Designation D 1238 using conditions of 190° C. and 10.0 kg mass.

The molecular weight distribution ("$M_w/M_n$") for substantially linear ethylene polymers is the weight average molecular weight ("$M_w$") divided by number average molecular weight ("$M_n$"). $M_w$ and $M_n$ are measured by gel permeation chromatography ("GPC"). For substantially linear ethylene polymers, the $I_{10}/I_2$ ratio indicates the degree of long-chain branching, i.e. the larger the $I_{10}/I_2$ ratio, the more long-chain branching exists in the polymer. In preferred substantially linear ethylene polymers $M_w/M_n$ is related to $I_{10}/I_2$ by the equation: $M_w/M_n \leq (I_{10}/I_2) - 4.63$. Generally, $M_w/M_n$ for substantially linear ethylene polymers is at least about 1.5 and preferably at least about 2.0 and is less than or equal to about 3.5, more preferably less than or equal to about 3.0. In a most preferred embodiment, substantially linear ethylene polymers are also characterized by a single differential scanning calorimetry ("DSC") melting peak.

The preferred $I_2$ melt index for these substantially linear ethylene polymers or linear ethylene polymers is from about 0.01 gram/ten minutes ("g/10 min") to about 100 g/10 min, and more preferably about 0.1 g/10 min to about 10 g/10 min.

The substantially linear ethylene polymer or linear ethylene polymer is employed in the blends of the present invention in amounts sufficient to provide the desired balance of processability and impact resistance. In general, the substantially linear ethylene polymer or linear ethylene polymer is employed in amounts of at least about 1 part by weight, preferably at least about 2 parts by weight, more preferably at least about 4 parts by weight, and most preferably at least about 7 parts by weight based on 100 weight parts components (a), (b) and (c). In general, the substantially linear ethylene polymer or linear ethylene polymer is used in amounts less than or equal to about 50 parts by weight, preferably less then or equal to about 40 parts by weight, more preferably less then or equal to about 35 parts by weight, and most preferably less than or equal to about 30 parts by weight based on 100 weight parts components (a), (b) and (c).

Polymer blend compositions such as a polycarbonate and a substantially linear ethylene polymer or a linear ethylene polymer are immiscible or incompatable. Such an incompatable polymer blend compostition can demonstrate undesirable effects, for example, decreased mechanical and/or toughness properties and surface properties such as pearlescence, blistering, and delamination. Controlling and stablizing the dispersed phase morphology, for instance, by a means which lowers the interfacial tension and promotes interfacial adheasion between the two phases, can reduce these undesirable effects. One such means is a compatibilizing graft copolymer. A compatibilizing graft copolymer is defined herein as one or more polymer which renders a substantially linear ethylene polymer or a linear ethylene polymer, at least to some extent, compatible with polycarbonate. Generally, a compatibilizing graft copolymer comprises (1) a portion which is miscible with the polycarbonate component and (2) a portion which is miscible with the substantially linear ethylene polymer or linear ethylene polymer component. The effectiveness of compatibilization is indicated by the domain structure of the dispersed phase in the polymer blend composition before and after the compatibilizing graft copolymer is added. Compatibilization is provided when the dispersed phase becomes more evenly dispersed and the domains become finer and less fibrous in nature. For example, domains of thick fibers are less compatible than ones of fine fibers, further, fine fibers are less compatible than elongated particles, and further yet, elongated particles are less compatible than spherical particles.

The compatibilizing graft copolymer (c) comprises a copolymer component (sometimes referred to as "grafted copolymer component") grafted onto an olefinic polymer substrate component. The grafted copolymer component preferably comprises copolymers of monovinylidene aromatic monomers, especially styrene (also substituted styrenes such as alpha-methylstyrene), with one or more additional unsaturated, copolymerizable monomers, preferably ethylene, methyl methacrylate, maleic anhydride, or more preferably the ethylenically unsaturated nitrile monomers (such as acrylonitrile and/or methacrylonitrile). A preferred graft copolymer comprises a styrene and acrylonitrile copolymer with styrene/acrylonitrile monomer ratios in the range of from about 90/10 to about 40/60, preferably from about 90/10 to about 50/50, and most preferably from about 80/20 to about 60/40. Preferred compatibilizing graft copolymer components suitable for use in the compositions according to the present invention comprise a grafted copolymer component of styrene and acrylonitrile in amounts of at least about 5 parts, preferably at least about 30 parts, and more preferably at least about 40 parts by weight, based on the total weight of the compatibilizing graft copolymer with the balance being the olefinic polymer substrate component. The compatibilizing graft copolymers suitable for use in compositions of the present invention comprise a grafted copolymer component preferably of styrene and acrylonitrile in amounts of less than or equal to about 75 parts, preferably less than or equal to about 70 parts, and more preferably less than or equal to about 60 parts by weight, based on a total weight of the compatibilizing graft copolymer with the balance being the olefinic polymer substrate component.

The copolymer component is grafted onto an olefinic polymer substrate component, preferably one or more substantially linear ethylene polymer or linear ethylene polymer, and more preferably an ethylenically unsaturated site in the backbone of an olefinic homopolymer such as ethylene or propylene, preferably a copolymer of ethylene and one or more $C_2$ to $C_{20}$ alpha-olefin, more preferably an ethylene and monovinylidene aromatic copolymer, even more preferably an ethylene, propylene, and optional diene copolymer, or most preferably an ethylene, propylene, and non-conjugated diene terpolymer ("EPDM"), wherein a preferred non-conjugated diene is dicyclopentadiene, more preferably 1-4-hexadiene, and even more preferably ethylidene norbornene. A preferred ethylene, propylene, and non-conjugated diene terpolymer to which the graft copolymer is attached is characterized by a weight ratio of ethylene to propylene in the range of between about 50/50 and about 75/25 and preferably possesses an intrinsic viscosity, as measured in tetralin at 135° C. (275° F.), in the range of between about 1.5 and about 2.6. The Mooney Viscosity (ML-4 at 275° F.) of the rubber portion is in the range of between about 30 to about 100. Typically, the ungrafted rubber is defined by an Iodine number in the range of between about 4 and about 30.

A preferred compatibilizing graft copolymer of the present invention comprises a copolymer of styrene and acrylonitrile grafted onto an ethylene, propylene, and non-conjugated diene terpolymer ("EPDM-g-SAN").

The method by which the graft copolymer is preferably formed, that is, the method by which the preferred styrene and acrylonitrile copolymer is grafted onto the preferred ethylene, propylene, and non-conjugated diene terpolymer is generally known in the art and is set forth in detail in U.S. Pat. Nos. 3,489,821; 3,489,822; and 3,642,950. It will be understood that in practice the product of the graft copolymerization process is actually a mixture of true grafted copolymer component onto the olefinic polymer substrate component along with a certain amount of separate, ungrafted copolymer component (that is, the grafting efficiency is not 100 percent).

The compatibilizing graft copolymer is employed in the polymer blend compositions of the present invention in amounts sufficient to provide the desired balance of physical properties, impact resistance, processability, and reduced tendency towards delamination in molded articles. In general, the compatibilizing graft copolymer is employed in amounts of at least about 0.01 part by weight, preferably at least about 0.1 part by weight, more preferably at least about 1 part by weight, and most preferably at least about 3 parts by weight based on 100 weight parts components (a), (b) and (c). In general, the compatibilizing graft copolymer is used in amounts less than or equal to about 10 parts by weight, preferably less than or equal to about 8 parts by weight, more preferably less than or equal to about 7 parts by weight, and most preferably about 5 parts by weight based on 100 weight parts components (a), (b) and (c).

The claimed polymer blend compositions may also optionally contain an additive component (d) which is one or more additives that are commonly used in polymer blend compositions of this type. Preferred additives of this type include, but are not limited to: impact modifiers, fillers, reinforcements, ignition resistant additives, stabilizers, colorants, flow enhancers, antioxidants, antistats, etc. Preferred examples of additives are impact modifiers such as, but not limited to core-shell graft copolymers or fillers, such as, but not limited to talc, clay, wollastonite, mica, glass or a mixture thereof. Additionally, ignition resistance additives, such as, but not limited to halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Further, compounds which stabilize polymer blend compositions against degradation due to causes such as, but not limited to heat, light, and oxygen, or a mixture thereof may be used. If used, such additives may be present in their typical effective amounts which may vary but range generally from about 0.01 part to about 25 parts by weight, preferably about 1 part to about 15 parts by weight, and more preferably from about 1 part to about 10 parts by weight based on 100 weight parts of components (a), (b) and (c).

Also included within this invention are the reaction products, if any, of the above named components when admixed in the polymer blend compositions of this invention.

Preparation of the polymer blend compositions of this invention can be accomplished by any suitable mixing means known in the art. The polymer blend compositions of this invention can be produced by dry blending the polycarbonate, the substantially linear ethylene polymer or the linear ethylene polymer, and the compatibilizing graft copolymer in particulate form with sufficient agitation to obtain thorough distribution. A Henschel mixer, a ribbon blender, or a dough-mixer can be used for dry blending. The dry blended mixture is then melt blended in an extruder, mixing rolls, or a Banbury mixer and the resulting polymer blend composition can then be molded into a shaped article. Alternatively, and preferably, (a) a polycarbonate, (b) a substantially linear ethylene polymer or a linear ethylene polymer, (c) a compatibilizing graft copolymer, preferably an EPDM-g-SAN, and all (d) other additives to be mixed with the blend are metered in appropriate amounts into an extruder or reciprocating screw injection molding machine, melt mixed in the extruder or injection molding machine, and then extruded or molded into a shaped article.

The polymer blend compositions of this invention are thermoplastic and when softened or melted by the application of heat, they can be formed or molded using conventional techniques such as compression molding, injection molding, gas assisted injection molding, calendering, vacuum forming, thermoforming, extrusion and/or blow molding, alone or in combination. The polymer blend compositions can also be formed, spun, or drawn into films, fibers, multi-layer laminates or extruded sheets, or can be compounded with one or more organic or inorganic substances, on any machine suitable for such purpose.

To illustrate the practice of this invention, examples of preferred embodiments are set forth below. However, these examples do not in any manner restrict the scope of this invention. Some of the particularly desirable features of this invention may be seen by contrasting the characteristics of the Examples with those of various controlled formulations which do not possess the features of, and are not therefore embodiments of this invention.

The compositions of Examples 1-7 and Controls B–D and F are prepared by mixing the dry components in a paint mixer for 5 minutes, and then feeding the dry-blended formulation through a 30 mm (1.18 inch) Werner and Pfleider extruder. The following were the compounding conditions on the Werner and Pfleider twin screw extruder: Barrel temperature profile: 190, 260, 260, 260, and 260° C. (374, 500, 500, 500 and 500° F.); Melt temperature: 270° C. (518° F.); RPM: 245; Torque: 55–60 percent; Motor current: 50 amps. The extrudate is cooled in the form of strands and comminuted as pellets. The pellets are dried in an air draft oven for 3 hours at 120° C. (248° F.), and then are used to prepare test specimens on a 600 kilo Newton (kN) (70 ton) Arburg injection molding machine, having the following molding conditions: Barrel temperature of 290° C. (554° F.); Mold temperature of 85° C. (185° F.); Injection pressure: 4 mega Pascal (MPa) (40 bar); Holding pressure: 3.5 MPa (35 bar); Back pressure: 0.5 MPa (5 bar); and Screw speed: 3.8.

The formulation content of Example 1 and Control A, B and C are given below in Table 1, Examples 2 to 5 and Control D are given below in Table II, and Examples 6 and 7 and Controls E and F are given in Table III, all in parts by weight.

"PC 1" is a Bisphenol-A polycarbonate with an average molecular weight of about 18,600, 80 melt flow rate ("MFR") at 1.2 kg/300° C., and a molecular weight distribution, $M_w/M_n$, of 2.29;

"PC 2" is a Bisphenol-A polycarbonate with an average molecular weight of about 25,400, 17 MFR at 1.2 kg/300° C., and a molecular weight distribution, $M_w/M_n$, of 2.3;

"PC 3" is a Bisphenol-A polycarbonate with an average molecular weight of about 29,200, 14 MFR at 1.2 kg/300° C., and a molecular weight distribution, $M_w/M_n$, of 2.43;

"S/LEP 1" is a substantially linear ethylene copolymer of ethylene and 1-octene, as described above as component (b), having a density of approximately 0.87 g/cm$^3$, 30 melt index, a molecular weight distribution of 2.0, and a CBDI of greater than 50 (Engage ™ SM 8400 from DuPont/Dow Elastomers);

"S/LEP 2" is a substantially linear ethylene polymer, as described above as component (b), having a density of approximately 0.87 g/cm$^3$, 5.0 melt index, a molecular weight distribution of 2.1, and a CBDI of greater than 50 (Engage™ SM 8200 from DuPont/Dow Elastomers);

"EPDM-g-SAN 1" is a compatibilizing graft copolymer which is an ethylene, propylene, and non-conjugated diene elastomer (EPDM) grafted with styrene and acrylonitrile ("SAN") having a 50/50 weight percent ratio of SAN/EPDM. The S/AN ratio is 72/28, the E/P ratio is 45/55, the specific gravity is 0.98 g/cm$^3$, and the melt index at 265° C. and 21.6 kg is 20 g/ 10 min. (Royaltuf™ 372P20 from Uniroyal).

"EPDM-g-SAN 2" is a compatibilizing graft copolymer which is an ethylene, propylene, and non-conjugated diene elastomer grafted with a modified styrene with an EPDM E/P ratio of 57/43, a specific gravity of 1.04 g/cm$^3$, and a melt index at 265° C. and 21.6 kg of 24 g/10 min. (Royaltuf™ X330 from Uniroyal).

The results of the tests performed on the blended polycarbonate compositions of Examples 1 to 7 and Controls A to F are shown below in Tables I, II, and III.

Molecular weight determinations were determined by size exclusion chromatography using a UV detector and are reported in grams/mole ("g/mole").

MFR was determined according to ASTM D 1238, at conditions of 300° C. and an applied load of 1.2 kg.

Capillary rheology testing was determined using a Sintech 10/D capillary rheometer according to ASTM D 3835. The capillary used was a conical entrance die with a 12.7 mm (0.5inch) diameter and a length to diameter ratio of 20: 1. Testing was performed at various temperatures between 270 to 300° C. (518 to 572° F.) and the shear melt viscosity ($\eta$) is reported as Pascal-seconds (Pa-s) for a specific shear rate ($\gamma$, s$^{-1}$) at the wall. Lower values represent lower viscosity or easier processing material.

Spiral flow was determined on a 600 kN (70 ton) Arburg injection molding machine and reported in centimeters ("cm") or inches ("in"). The spiral flow mold consisted of an Archimedes trapezoidal runner measuring 3.13 mm (0.12 inch) deep and 5.025 mm (0.19 inch) at the bottom with a 0.6 mm (0.02 inch) radius on each side and a 10° angle:

"Condition 1" was with an 80° C. (176° F.) mold temperature, a 275° C. (527° F.) barrel temperature and flow was determined at 9 MPa (90 bar) first stage hydraulic injection pressure.

"Condition 2" was with a 65° C. (149° F.) mold temperature, 270° C. (518° F.) barrel temperature and 6 MPa (60 bar) first stage injection pressure.

"Condition 3" was with a 65° C. (149° F.) mold temperature, 285° C. (545° F.) barrel temperature and 6 MPa (60 bar) first stage injection pressure.

"Condition 4" was with a 65° C. (149° F.) mold temperature, 300° C. (572° F.) barrel temperature and 6 MPa (60 bar) first stage injection pressure.

Impact resistance was measured by the notched Izod test ("Izod") according to ASTM D 256 (Method A) at room temperature ("rt") conditions or under subambient conditions. Determinations were made on specimens in either the direction of flow, e.g. parallel to flow ("11"), or perpendicular to flow ("⊥"). Izod impact properties are reported in Joules/meter ("J/m") and foot pound/inch ("ft-lb/in"). Ductile Brittle Transition Temperature ("DBTT") was determined at the point where half of the total samples tested had brittle failure. The notch is 0.254 mm (0.001 inch) in radius and samples were tested at least 48 hours after being notched.

Izod weldline strength is also measured according to ASTM D 256 (Method A) but with respect to a sample which has been formed with a butt weld in a double gated mold. The sample is unnotched, and is placed in the vice so that the weld is coincident with the top surface of the vice jaws.

Instrumented impact was determined according to ASTM D 3763 using a Dynatup instrumented impact tester with a 45.4 kg (100 pound) weight and a 1086 kg (2394 pound) tup calibration factor and results are reported in Joules ("J") or inch-pounds ("in-lb").

Deflection temperature under load ("DTUL") was determined in accordance with ASTM D 648 where test specimens were unannealed and under an applied pressure of 0.46 MPa (66 pound/square inch, "psi").

Tensile strength testing was done in accordance with ASTM D 638. Tensile Type 1 test specimens were conditioned at 23° C. (73° F.) and 50 percent relative humidity 24 hours prior to testing. Testing was performed using a Sintech 2 mechanical tester.

Dispersed phase structure ("morphology") was determined according to the Normarski technique using an optical light microscope. This technique is described in detail by J. G. Delley, in *Photograph Through The Microscope*, 77, Eastman Kodak Co., Rochester, N.Y., 1988.

The data in Table 1 shows that polycarbonate (Control A) demonstrates low impact strength in certain aspects (e.g., low temperature ductility and room temperature Izod). Addition of a substantially linear ethylene polymer alone (Control B) results in some room and low temperature impact strength improvements and reduced viscosity of the blend but, shows evidence of incompatibility as determined by qualitative morphology characterization of the dispersed phase size of the polyolefin elastomer in the polycarbonate matrix. The addition of EPDM-g-SAN alone (Control C) results in compatibilization of the dispersed phase and some room and low temperature impact strength improvements but comparable or increased viscosity as compared to polycarbonate alone. It can be seen that, when an EPDM-g-SAN modifier is added to a blend of polycarbonate and a substantially linear ethylene polymer (Example 1), the resulting composition displays, when molded, effective compatibilization and a desirable balance of improved impact properties and lower viscosity compared to either polycarbonate (Control A), a blend of polycarbonate and a substantially linear ethylene polymer (Control B), or a blend of polycarbonate and EPDM-g-SAN (Control C).

The data in Table II shows that polycarbonate blended with a compatibilizing graft copolymer with no substantially linear ethylene polymer or linear ethylene polymer (Control D) demonstrates good impact resistance with poor flow characteristics in certain aspects. Examples 2 to 5 demonstrate polymer compositions of this invention with a good balance of both flow and impact properties and reduced tendency towards delamination.

The data in Table III shows that polycarbonate with higher molecular weight (Control E versus Control A) shows good impact performance under more aspects but is nearly an order of magnitude more viscous than a polycarbonate with lower molecular weight. The addition of a substantially linear ethylene polymer to the polycarbonate with higher molecular weight (Control F) improves the flow properties and impact properties under some aspects. Examples 6 to 7 of the current invention demonstrate that a polymer composition of a polycarbonate, substantially linear ethylene polymer, and a compatibilizing graft copolymer consisting of a styrene and acrylonitrile copolymer grafted to an ethylene, propylene, and non-conjugated diene terpolymer demonstrate an improved balance of both impact and flow properties.

TABLE I

Contents and Properties of Controls A to C and Example 1

|  | Control | | | Example |
|---|---|---|---|---|
|  | A | B | C | 1 |
| MATERIAL |  |  |  |  |
| PC 1 | 100 | 90 | 90 | 90 |
| S/LEP 1 |  | 10 |  | 9 |
| EPDM-g-SAN 1 |  |  | 10 | 1 |
| PROPERTY |  |  |  |  |
| Molded PC Mw, g/mole | 18,500 | 18,500 | 19,200 | 18,200 |
| Viscosity, $\eta$ at 80 $s^{-1}$ at 270° C., Pa·s | 191 | 152 | 213 | 163 |
| Viscosity, $\eta$ at 3000 $s^{-1}$ at 270° C., Pa·s | 105 | 68 | 97 | 69 |
| DBTT, ° C. (° F.) | >20 (>68) | −5 (23) | −5 (23) | −10 (14) |
| Izod, 11, at rt, J/m (ft-lb/in) | 117 (2.2) | 481 (9.0) | 443 (8.3) | 470 (8.8) |
| DTUL at 0.46 MPa (66 psi), ° C. (° F.) | 136 (276) | 136 (276) | 134 (273) | 135 (275) |
| Tensile Yield, MPa (psi) | 60.7 (8800) | 47.6 (6900) | 51.7 (7500) | 47.6 (6900) |
| Tensile Modulus, MPA (10⁵ psi) | 2068 (3.0) | 1654 (2.4) | 2068 (3.0) | 1930 (2.8) |
| Ultimate Strain, % | 30 | 76 | 45 | 27 |
| MORPHOLOGY |  |  |  |  |
| Skin | NA | Thick Fibers | Elongated Particles | Fine Fibers |
| Mid-way | NA | Thick Fibers/Elongated Particles | Spherical Particles | Fine Fibers/Spherical Particles |
| Core | NA | Elongated Particles | Spherical Particles | Spherical Particles |

TABLE II

Contents and Properties of Control D and Examples 2 to 7

|  | Control | Example | | | |
|---|---|---|---|---|---|
|  | D | 2 | 3 | 4 | 5 |
| MATERIAL |  |  |  |  |  |
| PC 2 | 93 | 93 | 93 | 93 | 93 |
| S/LEP 1 | 0 | 2 | 4 | 6 | 6 |
| EPDM-g-SAN 1 | 7 | 5 | 3 | 1 |  |
| EPDM-g-SAN 2 |  |  |  |  | 1 |
| PROPERTY |  |  |  |  |  |
| Extruded PC Mw, g/mole | 24,376 | 24,237 | 24,486 | 24,597 | 24,814 |
| Molded PC Mw, g/mole | 24,597 | 24,713 | 24,522 | 24,140 | 24,605 |
| MFR at 300° C./1.2 kg, g/10 min | 19.7 | 20.7 | 22.7 | 27.6 | 24.0 |
| Viscosity, $\eta$ at 270° C., Pa-s [$\gamma(s^{-1})$] | 967 [83] | 936 [84] | 848 [83] | 820 [84] | — |
| Viscosity, $\eta$ at 285° C., Pa-s [$\gamma(s^{-1})$] | 460 [82] | 445 [83] | 414 [83] | 339 [82] | — |
| Viscosity, $\eta$ at 300° C., Pa-s [$\gamma(s^{-1})$] | 278 [81] | 270 [81] | 254 [81] | 211 [81] | — |
| Spiral Mold, Condition 1, cm (in) | 55.4 (21.8) | 56.4 (22.1) | 57.2 (22.5) | 59.4 (23.4) | 56.4 (22.2) |
| DBTT, ° C. (° F.) | −40 (−40) | −35 (−31) | −40 (−40) | −40 (−40) | −35 (−31) |
| Izod, 11, at rt, J/m (ft-lb/in) | 689 (12.9) | 673 (12.6) | 641 (12.0) | 635 (11.9) | 673 (12.6) |
| Izod, 11, at 22° C., J/m (ft-lb/in) | 721 (13.5) | 684 (12.8) | 678 (12.7) | 646 (12.1) | 641 (12.0) |
| Izod, 11, at −29° C., J/m (ft-lb/in) | 604 (11.4) | 630 (11.8) | 603 (11.3) | 593 (11.1) | 619 (11.6) |
| Izod, ⊥, at rt, J/m (ft-lb/in) | 700 (13.1) | 577 (10.8) | 529 (9.9) | 413 (7.74) | 368 (6.9) |
| Izod, weldline, at rt, J/m (ft-lb/in) | 486 (9.1) | 924 (17.3) | 1111 (20.8) | — | 1164 (21.8) |
| Instrumented Impact, total energy at rt, J (in-lb) | 48.4 (428) | 43.2 (382) | 43.3 (383) | 42.0 (372) | 41.0 (363) |
| Ductile or Brittle failure | D | D | D | D | D |
| Instrumented Impact, total energy at −20° C. (−4° F.), J (in-lb) | 61.4 (543) | 54.5 (482) | 57.6 (510) | 50.2 (444) | 54.9 (486) |

TABLE II-continued

Contents and Properties of Control D and Examples 2 to 7

|  | Control | Example | | | |
|---|---|---|---|---|---|
|  | D | 2 | 3 | 4 | 5 |
| Ductile or Brittle failure | 3D/2B | 1D/4B | 3D/2B | 1D/4B | B |
| Tensile Yield, MPa (psi) | 53.8 (7807) | 53.3 (7733) | 52.7 (7651) | 51.1 (7407) | 52.7 (7642) |
| Elongation at Yield, % | 5.4 | 5.5 | 5.6 | 5.6 | 5.6 |
| Tensile Break, MPa (psi) | 52.0 (7546) | 44.7 (6485) | 52.4 (7604) | 53.3 (7727) | 57.1 (8289) |
| Elongation at Break, % | 75.3 | 36.4 | 77.9 | 85.4 | 97.9 |
| Tensile Modulus, MPa ($10^5$ psi) | 2200 (3.2) | 2172 (3.2) | 2116 (3.1) | 2027 (2.9) | 2047 (2.9) |

TABLE III

Contents and Properties of Controls E and F and Example 6 and 7

|  | Control | | Example | |
|---|---|---|---|---|
|  | E | F | 7 | 7 |
| MATERIAL |  |  |  |  |
| PC 3 | 100 | 90 | 90 | 90 |
| S/LEP 1 |  |  | 9 |  |
| S/LEP 2 |  | 10 |  | 9 |
| EPDM-g-SAN 1 |  |  | 1 | 1 |
| PROPERTY |  |  |  |  |
| Molded PC Mw, g/mole | 29,200 | 29,200 | 29,100 | 29,000 |
| Viscosity, η at 270° C., Pa-s [γ(s$^{-1}$)] | 1,139 [80] | 784 [90] | — | 868 [86] |
| Viscosity, η at 270° C., Pa-s [γ(s$^{-1}$)] | 510 [1,000] | 259 [1,000] | — | 305 [1,000] |
| Spiral Mold, Condition 2, cm (in) | 25.4 (10) | 33.0 (13) | 35.6 (14) | 35.6 (14) |
| Spiral Mold, Condition 3, cm (in) | 35.6 (14) | 38.1 (15) | 43.3 (17) | 40.6 (16) |
| Spiral Mold, Condition 4, cm (in) | 38.1 (15) | 45.7 (18) | 45.7 (18) | 45.7 (18) |
| DBTT, ° C. (° F.) | −30 (−22) | −35 (−31) | −40 (−40) | <−40 (<−40) |
| Izod, 11, at rt, J/m (ft-lb/in) | 801 (15.0) | 705 (13.2) | 668 (12.5) | 684 (12.8) |
| Izod, 11, at −30° C. (−22° F.), J/m | DBTT | 646 (12.1) | 673 (12.6) | 710 (13.3) |
| Tensile Yield, MPa (psi) | 64.1 (9300) | 49.6 (7200) | 56.5 (8200) | 56.5 (8200) |
| Elongation at Yield, % | 6.0 | 5.9 | 5.8 | 5.9 |
| Tensile Break, MPa (psi) | 64.1 (9300) | — | 57.3 (8300) | 55.2 (8000) |
| Elongation at Break, % | 95 | 66 | 99 | 98 |

What is claimed is:

1. A polymer blend composition comprising, in admixture,
    (a) a polycarbonate in an amount from about 50 to about 98.99 parts by weight;
    (b) a substantially linear ethylene polymer or a linear ethylene polymer in an amount from about 1 to about 49.99 parts by weight, which has:
        (i) a density of less than about 0.93 g/cm$^3$,
        (ii) a molecular weight distribution, $M_w/M_n$, of less than about 3.0, and
        (iii) a Composition Distribution Branch Index of greater than about 50 percent; and
    (c) a compatibilizing graft copolymer comprising a copolymer of a monovinylidene aromatic monomer with an ethylenically unsaturated nitrile monomer grafted onto an olefinic polymer substrate component, said compatibilizing graft copolymer being contained in an amount from about 0.01 to about 3 parts by weight;
    said parts by weight being based on 100 weight parts components (a), (b) and (c).

2. The composition of claim 1 wherein the substantially linear ethylene polymer or linear ethylene polymer is a copolymer of ethylene with a $C_3$ to $C_{20}$ alpha-olefin.

3. The composition of claim 1 wherein the substantially linear ethylene polymer or linear ethylene polymer is a copolymer of ethylene with propylene, 1-butene, 1-hexene or 1-octene.

4. The composition of claim 1 wherein the substantially linear ethylene polymer or linear ethylene polymer is a copolymer of ethylene and 1-octene.

5. The composition of claim 1 in the form of a molded or extruded article.

6. The composition of claim 1 wherein the grafted copolymer component comprises a styrene and acrylonitrile copolymer.

7. The composition of claim 1 wherein the olefinic polymer substrate component is an ethylene, propylene, and optional diene copolymer.

8. The composition of claim 7 wherein the olefinic polymer substrate component is a terpolymer of ethylene, propylene, and non-conjugated diene.

9. The composition of claim 1 wherein the compatibilizing graft copolymer comprises a copolymer of styrene and acrylonitrile grafted onto an ethylene, propylene, and non-conjugated diene terpolymer.

10. The composition of claim 1 further comprising a filler.

11. The composition of claim 10 wherein the filler is talc, wollastonite, clay, mica, glass or a mixture thereof.

12. The composition of claim 1 further comprising one or more ignition resistance additives selected from halogenated hydrocarbons, halogenated carbonate oligomers, halogenated diglycidyl ethers, organophosphorous compounds, fluorinated olefins, antimony oxide and metal salts of aromatic sulfur compounds.

13. The product resulting from the admixture of components set forth in claim 1.

14. The composition of claim 1 wherein the polycarbonate is in an amount from about 65 to about 96 parts by weight.

15. The composition of claim 1 wherein the polycarbonate is in an amount from about 80 to about 93 parts by weight.

16. The composition of claim 1 wherein the substantially linear ethylene polymer is in an amount from about 2 to about 40 parts by weight.

17. The composition of claim 1 wherein the substantially linear ethylene polymer is in an amount from about 4 to about 35 parts by weight.

18. The composition of claim 1 wherein the substantially linear ethylene polymer is in an amount from about 7 to about 30 parts by weight.

19. The composition of claim 1 wherein the compatibilizing graft copolymer is in an amount from about 0.1 to about 3 parts by weight.

20. The composition of claim 1 wherein the compatibilizing graft copolymer is in an amount from about 1 to about 3 parts by weight.

* * * * *